United States Patent Office 3,459,582
Patented Aug. 5, 1969

3,459,582
VINYLIDENE CHLORIDE TOP-COATED POLYPROPYLENE PACKAGING FILM
Isadore Swerlick, Amherst, N.Y., assignor to E. I. du Pont de Nemours and Company, Wilmington, Del., a corporation of Delaware
No Drawing. Filed Dec. 7, 1965, Ser. No. 512,210
Int. Cl. B44d 1/24; B32b 27/30
U.S. Cl. 117—68                                         5 Claims

ABSTRACT OF THE DISCLOSURE

A packaging film having a base layer of biaxially oriented polypropylene with at least one surface coated with a subcoat of polyethylene or copolymer of polyethylene and both surfaces top-coated with a polymer of 60 to 95 parts vinylidene chloride and 5 to 40 parts alkyl acrylate, the alkyl group having 1 to 3 carbons, and 1% to 10% acrylic acid based on the weight of previous components. The subcoat can have a thickness of up to 0.8 mil and a density of 0.910 to 0.935 and the top coating can be in an amount up to about 10 grams/square meter. The top coating can contain 2 to 8% of a wax such as carnauba wax.

---

The present invention relates to laminar structures and a method of manufacture therefor. More particularly, the present invention is directed to improvements in and relating to laminar articles of polypropylene suitable for conversion to packaging structures such as bags, containers and like packaging articles.

Laminar articles comprising a base film of biaxially oriented polypropylene having a coating of vinylidene chloride copolymer are known articles of manufacture desirable for use as packaging materials because characterized by a unique combination of physical properties such as heat sealability, permeability and resistance to penetration by greases not separately possessed by the uncoated base film. The main drawback of such laminar structures resides simply in the lack of durability at the seams or other points of sealing thereof. For example, packages made with a crimp seal from various coated base films have a tendency for either the coating or the base film to be somewhat damaged by the sharply serrated jaws of the crimp sealer and, while a neat appearing seal often is obtained, it is frequently found that the seal is of low durability as evidenced by rupturing of the package at the points of sealing thereof when the package is dropped or is subjected to sudden shock. Thus, prior efforts to provide structures of polypropylene having satisfactory durability when employed as packaging materials have not proven entirely satisfactory and it is, therefore, the principal object of the present invention to provide a novel improved packaging film of polypropylene.

According to the present invention, there is provided a packaging film comprising a base layer of biaxially oriented polypropylene having at least one surface coated with a subcoating of polyethylene or copolymers of ethylene and both surfaces thereof coated with a top coating comprising a polymer obtained from 60 to 95 parts by weight of vinylidene chloride and 5 to 40 parts by weight of an alkyl acrylate, the alkyl group having 1 through 3 carbon atoms and 1 to 10% by weight, based upon the total weight of the previous components, of acrylic acid. The packaging film of the invention preferably comprises a base layer of biaxially oriented polypropylene having at least one surface coated with a subcoating of polyethylene or a copolymer of ethylene having a density of between 0.910 and 0.935 gram per cubic centimeter at 25° C., and both surfaces thereof coated with a top coating comprising a polymer obtained from 78 to 82 parts by weight of vinylidene chloride and 18 to 22 parts by weight of an alkyl acrylate, the alkyl group having 1 through 3 carbon atoms and 1 to 10% by weight, based upon the total weight of the previous components, of acrylic acid, said polymer having an intrinsic viscosity of at least 0.5 as measured in tetrahydrofuran at 30° C.

According to the present invention, there is further provided a method of manufacture for making packaging films of polypropylene which comprises treating both surfaces of a biaxially oriented polypropylene film structure to promote the adhesive receptivity thereof; applying to at least one treated surface of said polypropylene film structure a subcoating of polyethylene or a copolymer of ethylene; treating the exposed surface of said subcoating to increase the surface polarity thereof; and adhering to both surfaces of said treated film structure to a top coating comprising a polymer obtained from 60 to 95 parts by weight, of vinylidene chloride and 5 to 40 parts by weight of an alkyl acrylate, the alkyl group having 1 through 3 carbon atoms and 1 to 10% by weight based upon the total weight of the previous components, of acrylic acid. In a preferred embodiment, the method of manufacture for making packaging films of polypropylene comprises treating both surfaces of a biaxially oriented polypropylene film structure to promote the adhesive receptivity thereof; applying a subcoating of polyethylene or a copolymer of ethylene of up to about 0.8 mil thickness to at least one treated surface of said polypropylene; treating the exposed surface of said subcoating to increase the surface polarity thereof; and adhering to both surfaces of said treated film structure a top coating comprising a polymer obtained from 78 to 82 parts by weight of vinylidene chloride and 18 to 22 parts by weight of an alkyl acrylate, the alkyl group having 1 through 3 carbon atoms and 1 to 10% by weight, based upon the total weight of the previous components, of acrylic acid, and additionally having 2 to 7.5% by weight, based also upon the total weight of the said previous components, of a naturally occurring wax having a melting point above about 75° C.

The nature and advantages of the packaging film of the present invention will be more clearly understood by the following description thereof.

The base layer of the packing film of the present invention is of polypropylene. In the preferred embodiment herein, the polypropylene in film form is molecularly oriented, preferably asymmetrically or biaxially oriented, as well as dimensionally stabilized by methods known per se as by stretching or rolling the film structure followed optionally by heat-setting. Such methods are described in, for example, U.S. Patent 3,141,912 and U.S. patent application Ser. No. 231,214, filed Oct. 17, 1962, now Patent 3,257,490.

At least one surface of the base film of polypropylene has a coating, referred to herein as a subcoating, thereon of polyethylene or a copolymer of ethylene. The coating or layer of polyethylene or copolymer of ethylene is up to about 0.8 mil thickness, preferably between 0.2 and 0.8 mil thickness, and may be such as is formed from solid ethylene polymers produced by the process described in, for example, U.S. Patents 2,153,553 and 2,188,465. The polyethylene or copolymer of ethylene is characterized by a density between about 0.910 and about 0.935 gram per cubic centimeter at 25° C. and a melt index between about 1.0 and about 25. Suitable copolymers are those of a major amount of ethylene with other monomers copolymerizable therewith such as, for example, propylene, 1-butene or vinyl acetate.

The base film of polypropylene also has a coating, referred to herein as a top coating, of a polymer obtained from vinylidene chloride, alkyl acrylate and acrylic acid.

In the embodiment of the packaging film wherein the polyethylene coating is adhered only to one surface of the base film of polypropylene, the top coating is firmly adhered both to the polyethylene subcoating on the one side and the base film surface on the other side. In the embodiment of the packaging film wherein both surfaces of the base film of polypropylene are coated with polyethylene, the top coating is firmly adhered to each subcoating of polyethylene. In all instances, the top coating is characterized by a thickness corresponding up to about 10 grams per square meter of film surface, preferably between about 4 and about 10 grams per square meter of film surface.

The top coating is a polymer obtained from 60 to 95 parts by weight of vinylidene chloride and 5 to 40 parts by weight of an alkyl acrylate having 1 through 3 carbon atoms and 1 to 10% by weight, based upon the total weight of the previous components, of acrylic acid. The top coating polymer is characterized preferably by an intrinsic viscosity of at least about 0.5, as measured in tetrahydrofuran and 30° C. The top coating also preferably contains between about 2% and 8% by weight, based also upon the total weight of the previous components of vinylidene chloride and the alkyl acrylate, of a naturally occurring wax having a melting point above about 75° C.

The method of manufacture provided by the present invention comprises treating at least one and preferably both surfaces of a biaxially oriented polypropylene film structure to promote the adhesive receptivity thereof; applying to at least one treated surface of said polypropylene film structure a subcoating of polyethylene or a copolymer of ethylene; treating the exposed surface of said subcoating to increase the surface polarity thereof; and adhering to both surfaces of the treated film structure a top coating comprising a polymer obtained from 60 to 95 parts by weight of vinylidene chloride and 5 to 40 parts by weight of an alkyl acrylate, the alkyl group having 1 through 3 carbon atoms and 1 to 10% by weight, based upon the total weight of the previous components, of acrylic acid.

The treatment of the surface or surfaces of the polypropylene consists of subjecting the surfaces to the action of a burning gaseous flame. More specifically, the treatment consists of passing a biaxially oriented polypropylene film structure through a flame emanating from the discharge opening of a burner supplied with a gaseous mixture of a hydrocarbon fuel and oxygen enriched air, the fuel being selected from the group of hydrocarbons consisting of paraffinic and olefinic hydrocarbons, the fuel equivalence ratio of the gaseous mixture being between about 0.95 and about 1.25, the oxygen ratio of the gaseous mixture being in general between about 0.25 and about 0.30, wherein the film as it traverses the flame is located at a distance from the burner less than the length of the unimpeded primary envelope of the flame but not less than the distance below which the velocity of the burning gases escaping from the immediate vicinity of the discharge opening of the burner exceeds the burning velocity of the flame, and maintaining the surface on which the film is supported as it traverses the flame heated at a temperature between about 55° C. and about 75° C. At least one of the thusly treated surface of the polypropylene film structure is then coated with a subcoating of polyethylene or a copolymer of ethylene of thickness up to about 0.8 mil, preferably 0.2 to 0.8 mil. The subcoating of polyethylene or copolymer of ethylene may be melt extruded onto the surface treated polypropylene film structure in any manner as are well known in the art. The exposed surface of the subcoating of polyethylene or copolymer of ethylene that is not adhered to the polypropylene may be optionally treated prior to being coated with the top coating material in order to increase the surface polarity thereof. This may be accomplished by any conventional polyethylene surface treating technique such as flame treatment or electrical discharge treatment. The top coating of vinylidene chloride polymer may be conveniently applied in the form of an aqueous dispersion to the treated surfaces of the subcoating and the polypropylene base film. It also can be applied in an organic solvent. The application of the top coating may be accomplished by any convenient coating technique to secure a coating having a thickness corresponding to about 4 grams to about 10 grams per square meter of film surface.

The principle and practice of the present invention will now be illustrated by the following example which is provided to show the practice and use thereof, but it is not intended that the invention be limited thereto since modifications in technique and operation will be apparent to anyone skilled in the art.

EXAMPLE

Both surfaces of a biaxially oriented polypropylene film of 1 mil thickness were subjected to a flame treatment under the following conditions: lip opening of the burner, 100 mils; distance of the film from the opening of the burner, 3 millimeters; length of primary envelope of the flame, 4.0 millimeters; temperature of the drum over which the film passes, 70° C.; oxygen ratio, 0.29; fuel equivalence ratio, 1.0; film speed, 350 feet per minute.

The resulting flame treated polypropylene film was then coated on one surface by melt-extruding thereon at 315° C. a polyethylene resin. The polypropylene film having a coating of 0.3 mil thickness of polyethylene on one surface was subjected to flame treatment on the polyethylene surface under the conditions described immediately above, and thereafter was passed at a speed of 50 feet per minute through a coating bath containing an aqueous dispersion of 40% solids of a polymer obtained from 80 parts by weight of vinylidene chloride, 20 parts by weight methyl acrylate and 4% by weight, based upon the total weight of the previous components, of acrylic acid. The dispersion also contained 5% by weight of carnauba wax, 0.5% by weight of polyvinyl chloride particles, Geon 126, B. F. Goodrich Chemical Co.) and 2% by weight of DUPONOL WAQ [1], all based upon the total weight of the vinylidene chloride and the methyl acrylate. The excess coating was doctored from the film surfaces and the film dried in a coating tower. The dried film had a stop coating of approximately 8 grams per square meter on each film surface.

The performance of the coated film of the example and the durability of bag structures made therefrom were evaluated in the following manner. Bags were fabricated from the coated film by folding sample sheets thereof whereby the polypropylene film bearing only the top coating formed the exterior of the bag and the other side of the polypropylene film having the subioating of polyethylene and the top coating formed the interior of the bag structure. The side seam of the bag structures was of a lap-seam construction wherein the interior of one end portion of the folded sample sheet was lapped over the exterior of the adjacent end portion. The top and bottom seals of the bag were made contacting the interior surfaces. All seams were sealed by heat sealing. The sample bags were filled with 40 grams of rice before sealing and then were subjected to a durability test which consisted of dropping each sample bag from a height of 20 inches. The sample bags exhibited a total number of drops of between 20 and 30 before rupturing of any one of the seams thereof occurred. In direct contrast, sample bags made by reversing the interior and exterior surfaces so that the interior was formed of the polypropylene film bearing only the top coating failed by rupturing of the seam after only between 2 and 5 drops.

---

[1] Sodium salt of a fatty alcohol sulfate in aqueous solution (33% by weight active ingredient).

What is claimed is:

1. A packaging film comprising a base layer of biaxially oriented polypropylene having at least one surface coated with a subcoat of polyethylene or a copolymer of ethylene and both surfaces coated with a top coating consisting essentially of a polymer obtained from 60 to 95 parts by weight of vinylidene chloride and 5 to 40 parts by weight of an alkyl acrylate, the alkyl group having 1 through 3 carbon atoms, and 1% to 10% by weight based upon the total weight of the previous components, of acrylic acid.

2. The packaging film of claim 1 wherein the subcoating is charterized by a thickness of up to about 0.8 mil and a density between about 0.910 and about 0.935 gram per cubic centimeter at 25° C.

3. The packaging film of claim 1 wherein the top coating is characterized by a thickness corresponding up to about 10 grams per square meter of film surface.

4. The packaging film of claim 3 wherein the top coating contains between about 2% and about 8% by weight, based upon the total weight of vinylidene chloride and the alkyl acrylate, of a naturally occurring wax having a melting point above about 75° C.

5. The packaging film of claim 4 wherein the wax is carnauba wax.

References Cited

UNITED STATES PATENTS

| | | | |
|---|---|---|---|
| 2,968,576 | 1/1961 | Keller et al. | 117—47 |
| 3,262,808 | 7/1966 | Crooks et al. | 117—122 X |
| 3,285,766 | 11/1966 | Barkis et al. | 117—122 X |
| 3,347,697 | 10/1967 | Gmitro | 117—47 X |
| 3,362,841 | 1/1968 | Menikheim | 117—47 |
| 3,375,126 | 3/1968 | Nagel | 117—47 X |
| 3,161,532 | 12/1964 | Sill | 117—68 |

WILLIAM D. MARTIN, Primary Examiner

J. E. MILLER, Assistant Examiner

U.S. Cl. X.R.

117—46, 47, 76, 122, 138; 161—252, 256